United States Patent [19]

Bartels et al.

[11] Patent Number: 4,981,944

[45] Date of Patent: Jan. 1, 1991

[54] LIQUID COATING COMPOSITION CURABLE AT AMBIENT TEMPERATURES

[75] Inventors: Tamme Bartels, Vaassen; Gerardus J. W. M. Maters, Er Bergen Op Zoom, both of Netherlands

[73] Assignee: Akzo N. V., Arnhem, Netherlands

[21] Appl. No.: 365,996

[22] Filed: Jun. 14, 1989

[30] Foreign Application Priority Data

Jun. 15, 1988 [NL] Netherlands ............... 8801519

[51] Int. Cl.$^5$ .................................... C08G 2/38
[52] U.S. Cl. ........................... 528/220; 528/229; 528/230; 528/246; 528/263; 528/266; 525/7; 525/7.3; 525/10; 525/21; 525/22; 525/25; 525/257; 525/259; 525/437; 525/438; 525/445; 525/447; 428/500
[58] Field of Search ............ 528/220, 229, 230, 246, 528/263, 266; 525/7, 7.3, 10, 21, 22, 25, 257, 259, 437, 438, 445, 447; 428/500

[56] References Cited

U.S. PATENT DOCUMENTS

| | | | |
|---|---|---|---|
| 3,401,130 | 9/1968 | Korf et al. ............... | 525/7 |
| 3,876,587 | 4/1975 | Matsui et al. ............ | 525/327.3 |
| 3,961,786 | 6/1976 | Yanker . | |
| 4,146,519 | 3/1979 | Dhein et al. ............. | 525/286 |
| 4,251,597 | 2/1981 | Emmons et al. ......... | 428/500 |
| 4,303,563 | 12/1981 | Emmons et al. ......... | 525/257 |
| 4,730,033 | 3/1988 | Horley et al. ............ | 528/288 |

FOREIGN PATENT DOCUMENTS

| | | |
|---|---|---|
| 0099207 | 6/1983 | European Pat. Off. . |
| 0184302 | 10/1985 | European Pat. Off. . |
| 0246918 | 5/1987 | European Pat. Off. . |
| 2216573 | 7/1973 | Japan . |
| 50-16974 | 6/1975 | Japan . |
| 1048949 | 11/1964 | United Kingdom . |

OTHER PUBLICATIONS

Derwent Abstract: 38463U-A6, Toray "Acrylic Coating Proofs-From Polymer Coating Double Bond In Side Chain and an Ethylenically Unsat'd Monomer ".

*Primary Examiner*—John Kight, III
*Assistant Examiner*—Sam A. Acquath
*Attorney, Agent, or Firm*—Louis A. Morris

[57] ABSTRACT

A liquid coating composition is provided which comprises, as a binder, an addition polymer containing on average 2 or more pendant activated unsaturated groups and, as a crosslinking agent, a compound containing on average 2 or more primary amino groups. The pendant activated unsaturated groups of the addition polymer are based upon fumaric, maleic and/or itaconic acid and/or anhydrides thereof. The liquid coating compositions of the present invention provide the particular advantage of rapid cure at ambient temperatures.

12 Claims, No Drawings

LIQUID COATING COMPOSITION CURABLE AT AMBIENT TEMPERATURES

BACKGROUND OF THE INVENTION

The present invention relates generally to a liquid coating composition curable at ambient temperatures which comprises, as a binder, an addition polymer containing activated unsaturated groups and, as a crosslinking agent, a compound containing on average 2 or more primary amino groups which may be blocked or not with a ketone or aldehyde.

Such a coating composition is generally known from GB-A-2166749 (U.S. Pat. No. 4730033). which is incorporated by reference herein for all purposes. In this reference, the activated unsaturated groups are included as part of the main chain of the polymer. The curing reaction of this composition at ambient temperatures, however, is far too slow, so that after application the coating may be damaged by, for example, scratching or dust.

The present invention overcomes this disadvantage by providing a coating composition which cures rapidly at ambient temperatures, thereby greatly reducing the risk of damage from sources such as described above.

SUMMARY OF THE INVENTION

In accordance with the present invention, there is provided a liquid coating composition curable at ambient temperatures which comprises, as a binder, an addition polymer containing activated unsaturated groups and a crosslinking agent for the activated unsaturated groups of the addition polymer, wherein:

(1) the addition polymer contains, as activated unsaturated groups, on average 2 or more pendant groups of the formulas (I), (II) and/or (III)

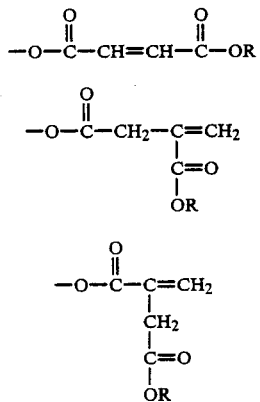

wherein R is selected from an H atom, a group $R^1$, a group of the formula (IV) and a group of the formula (V)

$$-CH(OH)-CH_2-CH_2R^2 \quad (IV)$$

$$-CH_2-CH(OH)-CH_2R^2 \quad (V)$$

wherein $R^1$ is selected from an alkyl group, a cycloalkyl group and an aryl group, which groups may be substituted or not with an alkyl and wherein $R^2$ is selected from an H atom, a group $R^1$ a group of the formula (VI) and a group of the formula (VII)

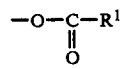

(2) the crosslinking agent for the activated unsaturated groups of the addition polymer contains on average 2 or more primary amino groups which may be blocked or not with an aldehyde or ketone.

It should be noted that the aforedescribed addition polymers appear in a general sense to be known from. e.g., JP No. 22165/73, U.S. Pat. No. 4146519 and GB No. 1048949, all of which are incorporated by reference herein for all purposes. These references, however, do not in any manner teach or suggest the curing of the activated unsaturated groups of the addition polymer with compounds containing an average of 2 or more primary amino groups.

DETAILED DESCRIPTION OF THE PREFERRED EMBODIMENTS

As a first example of an addition polymer suitable for use as the binder may be mentioned compounds resulting from the addition of maleic anhydride and/or itaconic anhydride to an OH groups-containing copolymer.

Such an OH groups-containing copolymer is preferably obtained by radical polymerization of a monomer mixture of:

(a) 5-90% by weight, more preferably 10-50% by weight, of a methylol (meth)acrylamide and/or a hydroxy(cyclo)alkyl (meth)acrylate with the (cyclo)alkyl group containing 1-18 carbon atoms, and (b) 10-95% by weight, more preferably 50-90 by weight, of another copolymerizable comonomer. Suitable other copolymerizable comonomers include acrylic and methacrylic esters of monoalcohols having 1-24 carbon atoms, such as methyl acrylate, methyl methacrylate, ethyl acrylate, n-propyl acrylate, n-butyl acrylate, isobutyl acrylate, 2-ethylhexyl acrylate, n-octyl acrylate, isobornyl acrylate and oleyl acrylate; dialkyl maleates, such as dimethyl maleate and diethyl maleate; vinyl esters of alkane carboxylic acids, such as vinyl acetate and vinyl propionate; and monovinyl aromatic compounds, such as styrene, vinyl toluene, and α-methyl styrene. Of course use may also be made of mixtures of 2 or more of the aforementioned comonomers.

Other suitable OH groups-containing copolymers include copolymers of styrene and allyl alcohol, partially hydrolyzed copolymers of vinyl chloride and vinyl acetate, and partially hydrolyzed copolymers of vinyl acetate and vinyl versatate. These copolymers and their preparative processes are known to one skilled in the art and need no further elucidation here.

The addition of maleic anhydride and/or itaconic anhydride to the above-described OH groups-containing copolymers is generally carried out at a temperature in the range of 50°-120° C., preferably in the range of 70°-120° C. During the addition there may optionally be present a catalyst such as a tertiary amine (e.g., pyridine) or an organic tin compound (e.g., dibutyl tin oxide) in a conventional amount, for instance, 0.1% by weight calculated on the reaction components.

After the addition of the maleic anhydride and/or itaconic anhydride to the OH groups-containing copolymer, the resulting carboxylic acid groups of the addition polymer may optionally be neutralized wholly or in part with an inorganic or organic base. As examples of suitable bases may be mentioned sodium hydroxide, potassium hydroxide and tertiary amines such as triethylamine and dimethyl aminoethanol. Depending on the acid number and the degree of neutralization, the binder may become water-dilutable and useable in water-dilutable coating compositions.

Alternatively, however, the carboxylic acid groups present in the binder may optionally be reacted wholly or in part with a different appropriate compound, such as a monofunctional epoxy compound or a monoalcohol.

Suitable monofunctional epoxy compounds include ethylene oxide, propylene oxide, butylene oxide, and the higher alkylene oxides; alkyl glycidyl ethers, such as butyl glycidyl ether or hexyl glycidyl ether; and the glycidyl esters of preferably branched alkane carboxylic acids, for instance the glycidyl esters of $\alpha,\alpha$-dimethyl octanoic acid, which last-mentioned ester is available under the trademark Cardura E from Shell Chemical.

Esterification with the epoxy compound generally takes place at a temperature in the range of 80°–140° C., preferably in the range of 100°–120° C. Esterification may optionally be carried out in the presence of a catalyst such as an organic ammonium salt or an organic $Cr^{III}$ salt (e.g., $Cr^{III}$-2-ethyl hexanoate) in conventional amounts, such as 0.01–2.0% by weight calculated on the reaction components.

Suitable monoalcohols include methanol, ethanol, propanol, isopropanol, n-butanol, isobutanol, cyclohexanol, n-decyl alcohol, n-dodecyl alcohol, tricyclodecyl methanol (TCDM), oleyl alcohol and stearyl alcohol.

Esterification with the monoalcohol generally takes place at a temperature in the range of 100°–180° C, preferably in the range of 120°–160° C. Esterification may optionally be carried out in the presence of a catalyst such as p-toluene sulfonic acid or an organic tin compound (e.g., butylchlorotindihydroxide) in conventional amounts, such as 0.01–2.0% by weight calculated on the reaction components.

As a second example of an addition polymer suitable for use as the binder may be mentioned compounds obtained by reacting a monoester of maleic acid, fumaric acid and/or itaconic acid with an at least difunctional epoxy compound.

As examples of suitable difunctional or polyfunctional epoxy compounds, which as such may be solid or liquid, may be mentioned the diglycidyl or polyglycidyl ethers of (cyclo)aliphatic or aromatic hydroxyl compounds, such as ethylene glycol, glycerol, cyclohexane diol, and mononuclear or polynuclear difunctional or trifunctional phenols and bisphenols such as bisphenol-A and bisphenol-F; polyglycidyl ethers of phenol formaldehyde novolak; polymers of ethylenically unsaturated compounds containing epoxy groups, such as glycidyl (meth)acrylate, N-glycidyl (meth)acrylamide, and/or allyl glycidyl ether, and optionally of one or more different copolymerizable ethylenically unsaturated monomers; cycloaliphatic epoxy compounds, such as epoxidized and optionally subsequently hydrogenated styrene or divinyl benzene; glycidyl esters of fatty acids having for instance 6–24 carbon atoms; glycidyl (meth)acrylate; isocyanurate group-containing epoxy compounds; an epoxidized polyalkadiene, such as epoxidized polybutadiene; hydantoin epoxy resins; epoxy resins obtained by epoxidizing aliphatic and/or cycloaliphatic alkenes, such as dipentene dioxide, dicyclopentadiene dioxide and vinyl cyclohexene dioxide; glycidyl groups-containing resins, such as polyesters or polyurethanes containing one or more glycidyl groups per molecule, and mixtures of the epoxy resins referred to above. These epoxy resins are generally known to one skilled in the art and need no further elucidation here.

Examples of suitable monoesters include fumaric, maleic and/or itaconic monoesters of alcohols such as methanol, ethanol, propanol, isopropanol, n-butanol, isobutanol, cyclohexanol, n-decyl alcohol, n-dodecyl alcohol, tricyclodecyl methanol (TCDM), oleyl alcohol and stearyl alcohol; and the monoesters of monoalkylene or polyalkylene glycols, the monoalkyl ethers and/or the monoalkane carboxylic esters thereof, such as mono(di)(propylene) ethylene glycol monomethyl(ethyl)ether, mono(di)(propylene) ethylene glycol acetate and higher analogous compounds.

The reaction of the monoester of maleic acid, fumaric acid and/or itaconic acid with the difunctional or polyfunctional epoxy compound is generally carried out at a temperature in the range of 80°–140° C., preferably in the range of 100°–120° C. During the reaction use may be made of a catalyst such as an ammonium salt or an organic chromium compound (e.g., $Cr^{III}$-2-ethyl hexanoate) in conventional amounts, such as 0.01–2.0% by weight calculated on the reaction components.

As a third example of an addition polymer suitable for use as the binder may be mentioned those obtained by reacting a monofunctional epoxy compound with a monoester of fumaric acid, maleic acid and/or itaconic acid, then reacting the resulting compound through the hydroxyl group with an at least difunctional isocyanate compound.

Suitable isocyanate compounds include aliphatic, cycloaliphatic or aromatic di-, tri- or tetraisocyanates which may be ethylenically unsaturated or not, such as
1,2-propylene diisocyanate,
trimethylene diisocyanate,
tetramethylene diisocyanate.
2,3-butylene diisocyanate,
hexamethylene diisocyanate,
octamethylene diisocyanate,
2,2,4-trimethyl hexamethylene diisocyanate,
2,4,4-trimethyl hexamethylene diisocyanate,
dodecamethylene diisocyanate,
$\omega,\omega'$-dipropyl ether diisocyanate,
1,3-cyclopentane diisocyanate,
1,2-cyclohexane diisocyanate,
1,4-cyclohexane diisocyanate,
isophorone diisocyanate,
4-methyl-1,3-diisocyanatocyclohexane,
transvinylidene diisocyanate,
dicyclohexyl methane-4,4'-diisocyanate,
3,3'-dimethyl-dicyclohexyl methane-4,4'-diisocyanate,
a toluene diisocyanate, 1,3-bis(1-isocyanato-1-methylethyl)benzene,
1,4-bis(1-isocyanato-1-methylethyl)benzene,
1,3-bis(isocyanatomethyl)benzene, a xylylene diisocyanate,
1,5-dimethyl-2,4-bis(isocyanatomethyl)benzene,
1,5-dimethyl-2,4-bis(2-isocyanatoethyl)benzene,
1,3,5-triethyl-2,4-bis(isocyanatomethyl)benzene,
4,4'-diisocyanatodiphenyl,
3,3'-dichloro-4,4'-diisocyanatodiphenyl,
3,3'-diphenyl-4,4'-diisocyanatodiphenyl, 3,3'-dimethoxy-4,4'-diisocyanatodiphenyl,
4,4'-diisocyanatodiphenyl methane,
3,3'-dimethyl-4,4'-diisocyanatodiphenyl methane,
a diisocyanatonaphthalene, polyisocyanates having isocyanurate structural units, the adduct of 2 molecules of a diisocyanate, e.g. hexamethylene diisocyanate or isophorone diisocyanate, to a diol, such as ethylene glycol, the adduct of 3 molecules of hexamethylene diisocyanate to 1 molecule of water (available under the trade designation Desmodur N from Bayer AG), the adduct of 1 molecule of trimethylol propane to 3 molecules of toluene diisocyanate (available under the trade designation Desmodur L from Bayer AG), the adduct of 1 molecule of trimethylol propane to 3 molecules of isophorone diisocyanate, compounds such as 1,3,5-triisocyanatobenzene and 2,4,6-triisocyanato-toluene, and the adduct of 1 molecule of pentaerythritol to 4 molecules of toluene diisocyanate.

The reaction of the adduct of the monofunctional epoxy compound and the monoester of maleic acid, fumaric acid and/or itaconic acid with the difunctional or polyfunctional isocyanate compound is carried out, as a rule, at a temperature in the range of 20°-100° C. and preferably in the range of 50°-80° C. Optionally, use may be made of a catalyst such as a t-amine (e.g., triethylamine) or an organic tin compound (e.g., dibutyl tin oxide or dibutyl tin stearate) in a concentration of 0.01-1% by weight calculated on the constituents present.

The number average molecular weight of the addition polymers as described above should generally be in the range of 800 to 100 000, preferably in the range of 800 to 15 000.

The addition polymers should contain on average 2 or more pendant unsaturated groups, as otherwise the network formed upon crosslinking will be insufficiently dense.

As representative examples of the crosslinking agents to be used according to the invention may be mentioned aliphatic and/or cycloaliphatic amines having 2-10 primary amino groups, preferably 2-4 primary and 0-4 secondary amino groups, and having 2-24 carbon atoms. An average of at least 2 primary amino groups is also required to form a sufficiently dense network upon crosslinking.

Suitable examples of such polyamines include ethylene diamine, propylene diamine, butylene diamine, pentamethylene diamine, hexamethylene diamine, decamethylene diamine, 4,7-dioxadecane-1,10-diamine, dodecamethylene diamine, 4,7-dioxadodecane-1,12-diamine, 7-methyl-4,10-dioxatridecane-1,13-diamine, 1,2-diaminocyclohexane, 1,4-di-aminocyclohexane, 4,4'-diaminodicyclohexyl methane, isophorone diamine, bis(3-methyl-4-aminocyclohexyl)methane, 2,2-bis-(4-aminocyclohexyl)propane, nitrile tris(ethylamine), polyether polyamines, for instance those known under the trade designation Jeffamine from Jefferson Chemical Company, bis-(3-aminopropyl)ethylamine, 3-amino-1-(methylamino)propane, 3-amino-1-(cyclohexylamino)propane, and polyalkylene polyamines of the formula (VIII)

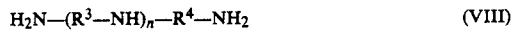

H₂N—(R³—NH)ₙ—R⁴—NH₂        (VIII)

wherein the group R⁴ and the n groups R³ may be the same or different, and represent an alkylene group having 2-6, more preferably 2-4 carbon atoms, and wherein n is an integer of 1-6, more preferably 1-3. By an alkylene group is meant here also a cycloalkylene group or an alkylene group containing an ether oxygen atom. Typical polyalkylene polyamines include diethylene triamine, dipropylene triamine and dibutylene triamine.

Of the aforementioned polyamines, it is preferred that they should be cycloaliphatic in nature and contain 5-15 carbon atoms, such as isophorone diamine. Especially preferred are those that further contain an α-alkyl group, such as bis-(3-methyl-4-aminocyclohexyl)methane and bis-(3-methyl-4-aminocyclohexyl)propane.

Other polyamines suitable for use according to the present invention include the adducts of a polyfunctional amino compound to one or more reactive groups of a monofunctional or polyfunctional epoxy, isocyanate and/or α,β-unsaturated carbonyl compounds.

Mention has already been made above of suitable epoxy and isocyanate compounds.

Suitable α,β-unsaturated carbonyl compounds include compounds containing acryloyl groups, methacryloyl groups, maleate groups and/or fumarate groups, such as the (meth)acrylic esters of di-, tri-, or polyvalent hydroxyl compounds, including polyester diols or polyester polyols and polyether diols or polyether polyols; adducts of a hydroxyl group-containing (meth)acrylic ester of a polyol on the one hand to an at least bifunctional isocyanate or epoxy compound on the other; and adducts of (meth)acrylic acid to an at least bifunctional epoxy compound. For brevity, these compounds will simply be referred to hereinafter as poly(meth)acryloyl compound.

Suitable (meth)acrylic esters of di-, tri- or polyvalent hydroxyl compounds include the esters of ethylene glycol, propylene glycol, diethylene glycol, tetramethylene diol, neopentyl glycol, hexamethylene diol, cyclohexane diol, 4,4'-dihydroxybenzophenone, bis-(4-hydroxycyclohexane)methane, glycerol, trimethylol ethane, trimethylol propane and pentaerythritol. In addition, such esters may optionally contain a hydroxyl group.

The hydroxyl group-containing (meth)acrylic esters on the basis of which the adduct to the at least bifunctional isocyanate or epoxy compound is formed are the (meth)acrylic esters of polyols as mentioned above. As suitable examples of the at least bifunctional isocyanate or epoxy compound that may be used to form the aforesaid adduct may be mentioned such isocyanate and epoxy compounds as were detailed earlier as components of the adducts of an amino compound to a polyfunctional isocyanate or epoxy compound, and need not be repeated here.

These poly(meth)acryloyl compounds in general preferably have an equivalent weight of 85-5000, more preferably of 100-1000.

The amino groups of the above-described polyamines, when used as a curing agent in the coating composition according to the invention, may optionally be blocked by an aldehyde or ketone having at most 10 carbon atoms, preferably 3-8 carbon atoms. Suitable blocking agents for the amino groups include acetaldehyde, acetone, methyl ethyl ketone, diethyl ketone, methyl isobutyl ketone, butyraldehyde, isobutyraldehyde, hydroxybutyraldehyde, pentanone, cyclohexanone, ethyl amyl ketone, hydroxycitronellal and isophorone. Blocking of amino groups is known in itself and needs no further elucidation here. The blocked polyamines generally have a number average molecular weight of 250-10 000, preferably of 300-3000.

An effective method for preparing the above-described blocked polyamines is reacting a monofunctional or polyfunctional epoxy, isocyanate, acryloyl or methacryloyl compound with a compound which, in addition to a blocked amino group, contains one or more secondary amino groups or hydroxyl groups.

The coating compositions generally contain so much binder and crosslinking agent as to give a ratio of the number of equivalents of the ethylenically unsaturated double bonds of the addition polymer to the number of equivalents of the primary amino groups of the curing agent, which may be blocked or not, in the range of 0.3 to 3.0, preferably in the range of 0.5 to 2.0.

The coating compositions usually also contain an organic solvent. As suitable examples may be mentioned aliphatic or aromatic hydrocarbons, esters, ethers, alcohols, ketones, diketo compounds such as acetyl ketone, nitroalkanes such as nitropropane, and (cyclo)aliphatic or aromatic esters of acetylacetic acid of which the (cyclo)alkyl group or the aromatic group has 1–20 carbon atoms, such as ethyl acetoacetate, cyclohexyl acetoacetate and phenyl acetoacetate. If, however, the binder is water-dilutable, the above-mentioned solvents may be replaced wholly or in part with water.

In addition, the coating compositions may contain the usual additives, such as pigments, fillers, levelling agents, emulsifiers, anti-foaming agents and other rheology control agents, antioxidants, UV stabilizers, anti-sag agents and catalysts such as organic carboxylic acids. Optionally, the composition may contain a non-functional polymer, such as an acrylate (co)polymer, cellulose acetopropionate, cellulose acetobutyrate, nitrocellulose or a vinyl polymer.

The coating composition may be applied to a substrate in any suitable manner, such as by roller coating, spraying, brushing, sprinkling, flow coating or dipping. It is preferred that the composition should be applied by spraying.

Suitable substrates include those of metals which may be pretreated or not, wood, synthetic materials, paper or leather. Suitable metals include iron, steel and aluminium. Curing of the coating may be carried out at a temperature of 0°–30° C. Optionally, a curing temperature above 30° C. may be used, so that the curing time may be reduced. For instance, the coating composition may be baked at a temperature in the range of 60°–120° C.

The invention will be further described in the following examples, which are not to be construed as limiting the scope of the present invention. The term "parts" used therein refers to "parts by weight" and "%" to "per cent by weight".

The viscosity was determined at 20° C. with a Rheomat 15 rotation viscometer.

The resistance of the coating to premium grade petrol or methyl ethyl ketone was determined after 7 days' drying at ambient temperature by placing on a coated panel a wad of cotton wool soaked with the solvent in question for 1 minute (methyl ethyl ketone) or 5 minutes (premium grade petrol), followed by scratching with a pencil of a 2B hardness.

The resistance was then rated on a 1–5 scale, where "1" is poor and "5" is excellent.

The hardness of a coating was determined by the Persoz test after drying for 1 day or 7 days at 20° C.

The pot life of a composition, given in hours, was determined at 20° C. by mixing stoichiometric amounts of resin and crosslinking agent and determining the increase in viscosity in conformity with the DIN cup method. The pot life is the time it takes for the viscosity to increase by 50%. The initial viscosity was set at 15 sec., measured with the help of a DIN cup 4.

EXAMPLES

Preparation of Binder A

Into a reactor was charged 1125 g of xylene, which was heated to boiling temperature. Next there were added, over a period of 3 hours:
512.8 g of butyl acrylate,
515.6 g of hydroxyethyl methacrylate,
1222.2 g of styrene,
270.0 g of xylene and
90.0 g of tert. butylperoxy-3,5,5 trimethyl hexanoate.
An additional 150.0 g of xylene was then added, and the reaction mixture was kept at boiling temperature until a conversion of over 98% was reached.

To 1961.6 g of the composition thus prepared were subsequently added:
4.3 g of dibutyl tin oxide and
176.4 g of maleic anhydride,
and the resulting mixture was heated to 80° C. The mixture was kept at a temperature of 80° C. until it had an acid number of 50.6 (the theoretical average maleic acid functionality was 7).

To 1071.2 g of the composition thus prepared were then added:
225.0 g of a glycidyl ester of α, α-dimethyl octanoic acid (commercially available under the trade designation Cardura E from Shell Chemical) and
0.64 g of chromium (III)-2-ethyl hexanoate,
and the resulting mixture was heated to 100° C. with air being passed through. The mixture was kept at 100° C. until it had an acid number of 5.9.

Obtained was a 62.0%-solution of Binder A with a viscosity of 190 cPa.s and a number average molecular weight of 7200.

Preparation of Binder B

Into a reactor was charged 2250 g of xylene, which was heated to boiling temperature. Next there were added, over a period of 3 hours:
887.0 g of butyl acrylate,
1800.0 g of hydroxyethyl methacrylate,
1208.7 g of styrene,
604.3 g of methyl methacrylate,
540.0 g of xylene and
180.0 g of tert. butylperoxy-3,5,5 trimethyl hexanoate.
An additional 300.0 g of xylene was then added, and the reaction mixture was kept at boiling temperature until a conversion of over 98% was attained.

To 3715.6 g of the composition thus prepared were subsequently added:
8.6 g of dibutyl tin oxide,
583.5 g of maleic anhydride and
2.15 g of hydroquinone monomethyl ether,
and the resulting mixture was heated to 80° C. with air being passed through. The mixture was kept at a temperature of 80° C. until it had an acid number of 79.8 (the theoretical average maleic acid functionality was 8).

To 1258.7 g of the composition thus prepared were then added:
0.85 g of chromium (III)-2-ethyl hexanoate and 434.7 g of a glycidyl ester of α, α-dimethyl octanoic acid (commercially available under the trade designation Cardura E from Shell Chemical),
and the resulting mixture was heated to 110° C. with air being passed through. After an acid number of 7.4 had been reached, the mixture was cooled and diluted with 477.1 g of xylene.

Obtained was a 57%-solution of Binder B with a viscosity of 162 cPa.s and a number average molecular weight of 3290.

Preparation of Binder C

Into a reactor was charged 2250 g of xylene, which was heated to boiling temperature. Next there were added, over a period of 3 hours:
432.0 g of butyl acrylate,
1800.0 g of hydroxyethyl methacrylate,
1512 g of styrene,
756.0 g of methyl methacrylate,
540.0 g of xylene and
80.0 g of tert. butylperoxy-3,5,5 trimethyl hexanoate.
An additional 300.0 g of xylene was then added, and the reaction mixture was kept at boiling temperature until a conversion of over 98% was attained.

To 683.5 g of the composition thus prepared were subsequently added:
8.52 g of dibutyl tin oxide,
578.5 g of maleic anhydride and
2.13 g of hydroquinone monomethyl ether,
and the resulting mixture was heated to 80° C. with air being passed through. The mixture was kept at a temperature of 80° C. until it had an acid number of 79.3 (the theoretical average maleic acid functionality was 7.5).

To 1254.8 g of the composition thus prepared were then added:
363.4 g of a glycidyl ester of α, α-dimethyl octanoic acid (commercially available under the trade designation Cardura E from Shell Chemical) and
0.81 g of chromium (III)-2-ethyl hexanoate,
and the resulting mixture was heated to 100° C. with air being passed through. After an acid number of 5.4 had been reached, the mixture was cooled and diluted with 138.2 g of xylene.

Obtained was a 60.4%-solution of Binder C with a viscosity of 371 cPa.s and a number average molecula weight of 3270.

Preparation of Binder D

Into a reactor was charged 2250.0 g of xylene, which was heated to boiling temperature. Next there were added, over a period of 3 hours:
432.0 g of butyl acrylate,
1800.0 g of hydroxyethyl methacrylate,
1512.0 g of styrene,
756.0 g of methyl methacrylate,
630.0 g of xylene and
315.0 g of tert. butyl peroxy-3,5,5 trimethyl hexanoate.
An additional 277.5 g of xylene was then added and the reaction mixture was kept at boiling temperature until a conversion of over 98% was attained.

To 3723.9 g of the composition thus prepared were subsequently added:
8.59 g of dibutyl tin oxide,
570.0 g of maleic anhydride and
2.15 g of hydroquinone monomethyl ether,
and the resulting mixture was heated to 80° C. with air being passed through. The mixture was kept at a temperature of 80° C. until it had an acid number of 78.7 (the theoretical average maleic acid functionality was 6.5).

To 1245.2 g of the composition thus prepared were then added:
377.9 g of a glycidyl ester of α, α-dimethyl octanoic acid (commercially available under the trade designation Cardura E from Shell Chemical) and
0.81 g of chromium (III)-2-ethyl hexanoate,
and the resulting mixture was heated to 100° C. with air being passed through. After an acid number of 6.0 had been reached, the mixture was cooled and diluted with 159.1 g of xylene.

Obtained was a 62.3%-solution of Binder D with a viscosity of 202 cPa.s and a number average molecular weight of 2840.

Preparation of Binder E

Into a reactor was charged 2250.0 g of xylene, which was heated to boiling temperature. Next there were added, over a period of 3 hours:
887.0 g of butyl acrylate,
1800.0 g of hydroxyethyl methacrylate,
1208.7 g of styrene,
604.3 g of methyl methacrylate,
630.0 g of xylene and
310.0 g of tert. butylperoxy-3,5,5 trimethyl hexanoate.
An additional 277.5 g of xylene was then added, and the reaction mixture was kept at boiling temperature until a conversion of over 98% was attained.

To 3675.3 g of the composition thus prepared were subsequently added:
8.48 g of dibutyl tin oxide,
562.6 g of maleic anhydride and
2.12 g of hydroquinone monomethyl ether,
and the resulting mixture was heated to 80° C. with air being passed through. The mixture was kept at a temperature of 80° C. until it had an acid number of 78.1, (the theoretical average maleic acid functionality was 7), after which 376.0 g of xylene were added.

To 1312.0 g of the composition thus prepared were then added:
407.2 g of a glycidyl ester of α, α-dimethyl octanoic acid (commercially available under the trade designation Cardura E from Shell Chemical) and
0.86 g of chromium (III)-2-ethyl hexanoate,
and the resulting mixture was heated to 100° C. with air being passed through. After an acid number of 6.5 had been reached, the mixture was cooled and diluted with 199.9 g of xylene.

Obtained was a 60%-solution of Binder E with a viscosity of 176 cPa.s and a number average molecular weight of 2700.

Preparation of Binder F

Into a reactor was charged 2896 g of Solvesso 100, which was heated to boiling temperature. Next there were added separately, first over a period of 3 hours, a mixture of:
55.6 g of butyl acrylate,
231.7 g of hydroxyethyl methacrylate,
194.6 g of styrene and
97.3 g of methyl methacrylate,
and second over a period of 3 hours and 10 minutes, a mixture of:
69.5 g of Solvesso 100 and
23.2 g of tert. butylperoxy-3,5,5 trimethyl hexanoate.

An additional 38.6 g of Solvesso 100 was then added, and the reaction mixture was kept at boiling temperature until a conversion of over 98% was attained.

Next, the composition thus prepared was cooled to 80° C. and there were added:
2.36 g of dibutyl tin oxide,
0.59 g of hydroquinone monomethyl ether and
179.7 g of itaconic anhydride,
and the resulting mixture was kept at 80° C. with air being passed through until an acid number of 74.4 was reached (the theoretical average itaconic acid functionality was 4.5).

The composition thus prepared was then diluted with an additional 119.6 g of Solvesso 100, followed by the addition of:
0.85 g of chromium (III)-2-ethyl hexanoate and
400.5 g of a glycidyl ester of α, α-dimethyl octanoic acid (commercially available under the trade designation Cardura E from Shell Chemical),
and the resulting mixture was heated to 100° C. with air being passed through. The mixture was kept at 100° C. until it had an acid number of 4.7, then diluted with 116.0 g of Solvesso 100.

Obtained was a 61.3%-solution of Binder F having a viscosity of 297 cPa.s and a number average molecular weight of 2470.

Preparation of Binder G

Into a reactor was charged 1650.0 g of diethylene glycol dimethyl ether, which was heated to boiling temperature. Next there were added separately, over periods of 3 hours, a first mixture of:
715.1 g of butyl acrylate,
1225.0 g of hydroxyethyl methacrylate and
1559.9 g of styrene
followed by a second mixture of:
200.0 g of diethylene glycol dimethyl ether and
70.0 g of tert. butylperoxy 3,5,5-trimethyl hexanoate,
and the reaction mixture was kept at boiling temperature until a conversion of over 98% was attained.

Next, an additional 455.0 g of diethylene glycol dimethyl ether was added and the resulting mixture was cooled.

To 5925.0 g of the composition thus prepared were then added:
8.0 g of dibutyl tin oxide,
877.0 g of maleic anhydride and
2.0 g of hydroquinone monomethyl ether,
and the resulting mixture was heated to 80° C. with air being passed through. The mixture was kept at 80° C. until it had an acid number of 74 (the theoretical average maleic acid functionality was 8.5).

To 800.0 g of the composition thus prepared were added:
0.4 g of chromium (III)-2-ethyl hexanoate,
0.4 g of hydroquinone monomethyl ether and
180.0 g of a glycidyl ester of α, α-dimethyl octanoic acid (commercially available under the trade designation Cardura E from Shell Chemical),
and the resulting mixture was heated to 110° C. with air being passed through. After an acid number of 37 had been reached, the mixture was cooled and diluted with 50.0 g of diethylene glycol methyl ether.

Obtained was a 65.7%-solution of Binder G with a viscosity of 560 cPa.s and a number average molecular weight of 3800.

Preparation of Binder H

Into a reactor were charged 500.0 g of white spirit (boiling range 140°-165° C.) and 500.0 g of Solvesso 100, which were heated to boiling temperature. Next, there were added separately, over periods of 3 hours, a first mixture of:
460.0 g of glycidyl methacrylate,
1071.0 g of styrene,
369.0 g of butyl acrylate and
100.0 g of lauryl methacrylate,
followed by a second mixture of:
300.0 g of xylene and
140.0 g of tert. butylperoxy 3,5,5-trimethyl hexanoate.
An additional 20.0 g of xylene was then added and the reaction mixture was kept at boiling temperature until a conversion of over 98% was attained.

To 500.0 g of the composition thus prepared were added:
52.8 g of monomethyl maleate,
5.5 g of hydroquinone monomethyl ether and
0.3 g of chromium (III)-2-ethyl hexanoate,
and the resulting mixture was heated to 100° C. with air being passed through. The mixture was kept at 100° C. until an acid number of 2.3 was reached (the theoretical average maleic acid functionality was 4), then diluted with 660.0 g of xylene.

Obtained was a 56.4%-solution of Binder H with a viscosity of 352 cPa.s and a number average molecular weight of 3480.

Preparation of Binder I

Into a reactor was charged 700.0 g of Solvesso 100, which was heated to boiling temperature. Next there were added separately, first over a period of 3 hours, a mixture of:
560.0 g of hydroxyethyl methacrylate,
560.0 g of styrene and
280.0 g of methyl methacrylate,
and second over a period of 3 hours and 10 minutes, a mixture of:
294.0 g of Solvesso 100 and
98.0 g of tert. butylperoxy 3,5,5-trimethyl hexanoate.
The reaction mixture was kept at boiling temperature until a conversion of over 98% was reached.

Next, the composition thus prepared was cooled to 80° C., after which were added:
5.0 g of dibutyl tin oxide,
2.5 g of hydroquinone monomethyl ether and
379.9 g of maleic anhydride.
The resulting mixture was kept at 80° C. with air being passed through until an acid number of 78.4 was reached (the theoretical average maleic acid functionality was 4).

To the compostion thus prepared were then added:
1.9 g of chromium (III)-2-ethyl hexanoate,
1.0 g of hydroquinone monomethyl ether and
920.8 g of a glycidyl ester of α, α-dimethyl octanoic acid (commercially availabler under the trade designation Cardura E from Shell Chemical),
and the whole was heated to 100° C. with air being passed through. The mixture was kept at 100° C. until an acid number of 10.2 was reached, then 700.0 g of Solvesso 100 were added.

Obtained was a 60.6%-solution of Binder I with a viscosity of 504 CPa.s and a number average molecular weight of 3020.

Preparation of Binder J

Into a reactor was charged 2240 g of xylene, which was heated to boiling temperature. Next there were added, over a period of three hours, a mixture of:
1702.0 g of hydroxyethyl methacrylate,
2480.6 g of styrene,
207.4 g of butyl acrylate,
940.8 g of xylene and
313.6 g of tert. butylperoxy 3,5,5-trimethyl hexanoate.
The reaction mixture was heated to and kept at boiling temperature until a conversion of over 98% was achieved.

To 4000.0 g of the composition thus prepared were subsequently added:
663.6 g of maleic anhydride and
0.66 g of butylchlorotindihydroxide (commercially available under the trade designation Fascat 4101 from M&T Chemicals).
and the whole was heated to 80° C. The reaction mixture was kept at 80° C. until an acid number of 87.0 was reached (the theoretical average maleic acid functionality was 4.5).

Tp 1500.0 g of the maleic functional composition thus prepared were then added:
322.7 g of n-butanol and
1.0 g of butylchlorotindihydroxide.
The whole was then heated to boiling temperature (with the resulting reaction water removed by azeotropic distillation), and kept at boiling temperature until an acid number of 4.5 was reached.

Obtained was a 54.5% solution of Binder J with a viscosity of 170cPa.s and a number average molecular weight of 4190.

Preparation of Binder K (Comparative Binder)

Into a reactor were successively charged:
2383.6 g of diethylene glycol,
3000.0 g of dipropylene glycol and
4475.0 g of adipic acid,
and the reaction mixture was heated to 50° C. with an inert gas being passed through.

When a temperature of 50° C. was reached, 1002.2 g of maleic anhydride was added, whereupon the whole was heated to 220° C., in which process the reaction water formed was removed by distillation. In the process a peak temperature of 100°–105° C. was maintained. After a viscosity of 1250 cPa.s had been attained, the mixture was cooled.

Obtained was a 100% Binder K having a viscosity of 1300 cPa.s.

Preparation of Crosslinking Agent A

Into a reactor were successively charged 1332 g of isophorone diisocyanate and 0.6 g of dibutyl tin dilaurate, which were heated to a temperature of 40° C. To this mixture was next added, over a period of 2 hours, a solution of 354 g of hexane diol-1,6 in 531 g of methyl isobutyl ketone. After one hour the resulting product had an isocyanate content of 11.5%.

In a separate reaction cycle, a reactor was successively charged with:
707.4 g of dipropylene triamine,
1188.0 g of methyl isobutyl ketone,
632.0 g of toluene and
14.1 g of a silica-alumina catalyst,
and the resulting mixture heated to boiling temperature, the reaction water formed being removed by azeotropic distillation. After 7 hours 193.6 g of water (99.6% of theory) had been collected.

The resulting solution was cooled to 60° C., after which over a period of 2 hours 2217 g of the aforementioned, separately prepared isocyanate group-containing adduct were added to it. This reaction mixture was kept at a temperature of 60° C. for one hour, after which 606 g of n-butanol were added. Finally, the resulting solution of Crosslinking Agent A was cooled, filtered, and stored.

Crosslinking Agent A contained on average 4 blocked primary amino groups.

Preparation of Crosslinking Agent B

Into a reactor were successively charged, under a nitrogen atmosphere:
1545.0 g of diethylene triamine,
330.0 g of methyl isobutyl ketone,
131.6 g of toluene and
2.0 g of formic acid,
and the resulting mixture was heated to boiling temperature, the reaction water formed being removed by azeotropic distillation. After 20 hours 53.9 g of water (99.8% of theory) had been collected.

The resulting solution was cooled to 60° C. after which over a period of 2 hours a solution of 297.7 g of a diglycidyl ether of bisphenol A (available under the trade designation Epikote 828 from Shell Chemical) in 446.5 g of toluene was added. This reaction mixture was kept at a temperature of 60° C. for 4 hours, after which the resulting solution of Crosslinking Agent B was cooled and stored without purification.

Crosslinking Agent B contained on average 4 blocked primary amino groups.

EXAMPLES 1–9 AND COMPARATIVE EXAMPLE 1

Coating compositions (200 g) on the basis of the above-described binders and crosslinking agents were prepared by admixing stoichiometric amounts of the two components listed in Table I below. Note that, as Crosslinking Agent C, was used 3,3'-dimethyl-4,4'-diaminodicyclohexyl methane (commercially available under the trade designation Laromin C 260 from BASF) blocked with methyl isobutyl ketone.

The coating compositions were sprayed onto a steel panel (Bonder No. 120) in a film thickness of 40 μm after drying at ambient temperature. The pot life of these compositions, their hardness and their resistance to organic solvents are also given in Table I.

TABLE I

| Ex | Binder | Crosslinking Agent | Persoz Hardness after 1 day | Persoz Hardness after 7 days | Resistance to Premium Grade Petrol | Resistance to Methyl Ethyl Ketone | Pot Life |
|---|---|---|---|---|---|---|---|
| 1 | A | A | 62 | 124 | 4 | 2 | 3 |
| 2 | B | B | 84 | 173 | 5 | 2 | 2.5 |
| 3 | C | A | 81 | 147 | 5 | 3 | 4 |
| 4 | D | B | 90 | 185 | 5 | 3 | 4 |
| 5 | E | A | 105 | 205 | 5 | 3–4 | 3.5 |
| 6[1] | F | A | 20 | 53 | 3 | 1 | <24 |
| 7 | G | C | 102 | 257 | 5 | 3 | 1.5 |
| 8 | G | A | 204 | 283 | 5 | 5 | 0.5 |
| 9 | H | A | 35 | 112 | 5 | 2 | 24 |
| C1 | K | A | tacky | tacky | 1 | 1 | >24 |

[1] = Itaconate containing composition

These results clearly show that the coating compositions in accordance with the present invention, which comprise binders including the pendant functional groups, are significantly improved in hardness and solvent resistance over a similar coating composition comprising a binder with built-in functionality.

EXAMPLE 10 AND COMPARATIVE EXAMPLE 2

Table II below gives the results of an IR test for the difference in reactivity between a binder according to the invention (Example 10, Binder I and a binder according to prior art methods (Comparative Example 2, Binder K). The coating compositions were applied on a KBr tablet and cured between KBr tablets at ambient temperature. The crosslinking agent was the same as in Example 7, but not blocked.

TABLE II

| Example | Content C = C after ... hours in % as compared with t₀ at 1650 cm⁻¹ | | |
|---|---|---|---|
| | 1 | 2 | 24 |
| 10 - Pendant maleate (I) | 81.0 | 73.8 | 42.1 |
| C2 - Built-in maleate (K) | 97.3 | 97.3 | 82.4 |

The results clearly show the higher reactivity and more rapid curing of the binders of the present invention (pendant functionality) over those with built-in functionality.

Many modifications and variations may be made to the embodiments specifically mentioned here without substantially departing from the concept of the present invention. Accordingly, it should be clearly understood that the preferred form of the invention described herein is exemplary only, and not intended as a limitation on the scope thereof.

We claim:

1. A liquid coating composition curable at ambient temperatures which comprises, as a binder, an addition polymer containing activated unsaturated groups and a crosslinking agent for the activated unsaturated groups of the addition polymer, wherein:

(1) the addition polymer contains, as activated unsaturated groups, on average 2 or more pendant groups of the formulas (I), (II) and/or (III)

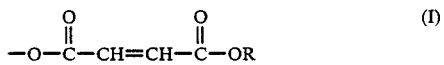

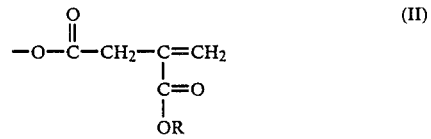

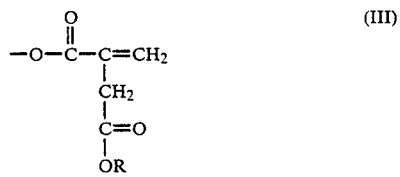

wherein R is selected from an H atom, a group $R^1$, a group of the formula (IV) and a group of the formula (V)

wherein $R^1$ is selected from an alkyl group, a cycloalkyl group and an aryl group, which groups may be substituted or not with an alkyl, and wherein $R^2$ is selected from an H atom, a group $R^1$, a group of the formula (VI) and a group of the formula (VII)

(2) the crosslinking agent for the activated unsaturated groups of the addition polymer contains on average 2 or more primary amino groups which may be blocked or not with an aldehyde or ketone.

2. The liquid coating composition of claim 1, wherein the addition polymer is obtained by the addition of maleic anhydride or itaconic anhydride to an OH groups-containing copolymer.

3. The liquid coating composition of claim 2, wherein the OH groups-containing copolymer is obtained by radical polymerization of a monomer mixture of:
(a) 5–90% by weight of a methylol (meth)acrylamide and/or hydroxy(cyclo)alkyl (meth)acrylate, and
(b) 10–95% by weight of another copolymerizable monomer.

4. The liquid coating composition of claim 2, wherein the acid groups of the addition polymer are neutralized wholly or in part with an inorganic or organic base.

5. The liquid coating composition of claim 2, wherein the acid groups of the addition polymer are esterified with a monofunctional epoxy compound or a monoalcohol.

6. The liquid coating composition of claim 1, wherein the addition polymer is obtained by the reaction of a monoester of maleic acid, fumaric acid and/or itaconic acid with an at least difunctional epoxy compound.

7. The liquid coating compositin of claim 1, wherein the addition polymer is obtained by reacting a monofunctional epoxy compound with a monoester of fumaric acid, maleic acid and/or itaconic acid, then reacting the resulting compound through the hydroxyl group with an at least difunctional isocyanate compound.

8. The liquid coating composition of claim 1, wherein the crosslinking agent for the activated unsaturated groups of the addition polymer comprises 2–4 primary amino groups and 0–4 secondary amino groups.

9. The liquid coating composition of claim 8, wherein the crosslinking agent is cycloaliphatic in nature and contains 5–15 carbon atoms.

10. The liquid coating composition of claim 9, wherein the crosslinking agent further contains an α-alkyl group.

11. The liquid coating composition of claim 1, wherein the ratio of the number of equivalents of ethylenically unsaturated double bonds of the addition polymer to the number of equivalents of the primary amino groups of the crosslinking agent is in the range of 0.3 to 3.0.

12. The liquid coating composition of claim 11, wherein said ratio is in the range of 0.5 to 2.0.

* * * * *